United States Patent [19]
Benz et al.

[11] Patent Number: 4,955,570
[45] Date of Patent: Sep. 11, 1990

[54] CLOSED HOLLOW SUPPORT

[75] Inventors: Erwin Benz, Gechingen; Wolfgang Rau, Renningen; Rainer Bauer, Wildberg; Gerd Willy, Weil-Newweiler, all of Fed. Rep. of Germany

[73] Assignee: Daimler-Benz Aktiengesellschaft, Stuttgart, Fed. Rep. of Germany

[21] Appl. No.: 379,171

[22] Filed: Jul. 12, 1989

[30] Foreign Application Priority Data

Jul. 12, 1988 [DE] Fed. Rep. of Germany ....... 3823522
May 6, 1989 [DE] Fed. Rep. of Germany ....... 3914960

[51] Int. Cl.$^5$ ............................................. F16M 3/00
[52] U.S. Cl. .................................. 248/300; 52/127.1; 52/796; 248/675
[58] Field of Search ............... 248/637, 675, 676, 152, 248/300; 52/127.1, 796

[56] References Cited

FOREIGN PATENT DOCUMENTS 1903327 6/1970 Fed. Rep. of Germany .
2459870 2/1981 France .................................. 52/797
1010678 11/1975 United Kingdom .

*Primary Examiner*—Ramon O. Ramirez
*Attorney, Agent, or Firm*—Evenson, Wands, Edwards, Lenahan & McKeown

[57] ABSTRACT

The invention relates to a closed hollow support which has stiffening sections in its interior. The stiffening sections are connected with the support section and with one another. The support sections, which form the outer surface of the hollow support, are welded together along longitudianl seams and at least one of them has holes which are suitable for guiding a welding tool, a screwdriver or a riveting tool used to connect the stiffening sections.

8 Claims, 3 Drawing Sheets

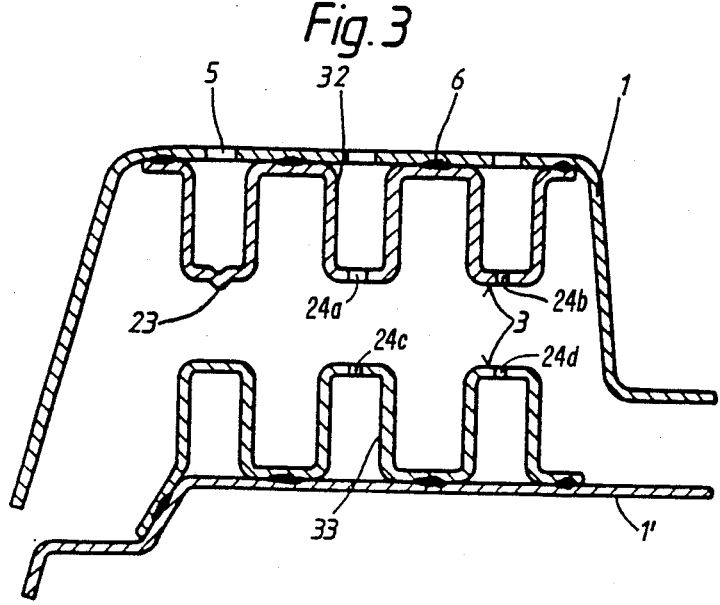
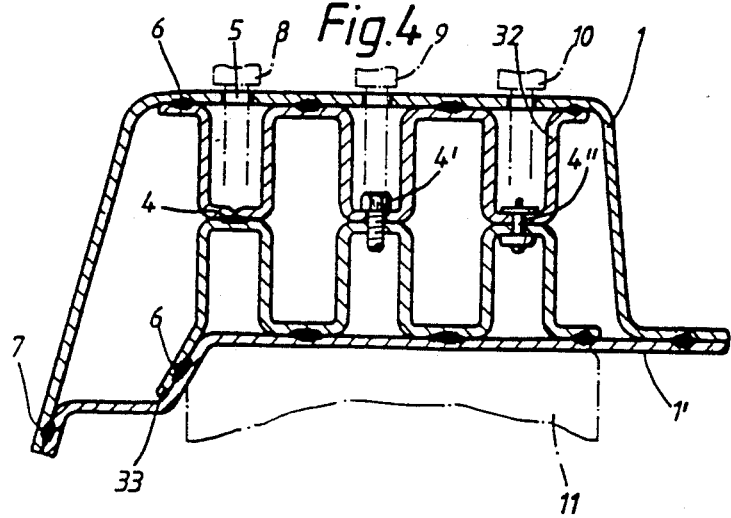

CLOSED HOLLOW SUPPORT

BACKGROUND AND SUMMARY OF THE INVENTION

The invention relates to a closed hollow support made of sheet metal having two support sections, which form a hollow space and are welded together in an area of their longitudinal edges. Two stiffening sections, which reinforce the hollow support are arranged in the hollow space of the hollow support and extend in longitudinal direction of the hollow support and are welded to the hollow support. This general type of hollow support is known from GB-PS 10 10 678.

These type of closed hollow supports are mainly used in vehicles of various types as box girders. For the purpose of a stabilization with respect to buckling and torsional movements and vibrations, these closed hollow supports are generally stiffened in various fashions According to GB-PS 10 10 678, the closed hollow support is formed by two support sections, welded together along their longitudinal edges, and has a hollow space which is enclosed by the support sections. Two stiffening sections, which stiffen the hollow support and extend in longitudinal direction of the hollow support, are welded into the hollow space. The welding of the stiffening sections can onlY take place successively, is inconvenient and results in insufficient stability under high stress, for example, as a hollow support of a vehicle during an accident.

Another possibility for stiffening a closed hollow support is described in DE-OS 19 03 327. There a continuous main support member, in the junction point, is stiffened by a stabilizing member which is placed on it on the outside and corresponds to its shape. Both members are welded together with one another at holes located in the stabilizing member. As a result, the outer contour of the closed hollow support is not smooth and may have to be trimmed or primed The instant invention is based on the object of further developing a closed hollow support of the above general type in such a manner that it is more stable and easier to manufacture.

According to the invention, this object is achieved by having each support section welded together with a stiffening section which has a meandering shape in its cross-section. The stiffening sections are arranged approximately mirror-invertedly in the hollow space and, in turn, are connected at mutual contact surface extending in the longitudinal direction of the hollow support. The connections are reached through opposing holes in at least one support section, which is assigned to the area of these connections.

The stiffening sections, which are connected with one another and are mounted in the closed hollow support, form a second hollow support which is located on the inside and utilizes the structure clearance. By welding-together each of the stiffening sections with the respective pertaining support section, the section part of each support half are prepared to be fixedly connected with one another. The mutual connection of the two interior stiffening sections through the wall of one of the support sections provides this connection and increases the stability of the closed hollow support by many degrees. The stiffening sections, after the support sections were first connected with the pertaining stiffening section and then with one another, can be fixedly connected on the inside through access holes.

When the closed hollow support is preassembled, the respective stiffening section is welded simultaneously to both support sections. The thus created hollow support halves are pressed together subsequently and welded together along their longitudinal edges. The connecting of the mutual contact surfaces of the stiffening sections advantageously takes place during the same working cycle in which the longitudinal edges of the support sections are welded together.

The stiffening sections, in the preassembled condition, together in transverse direction to the contact surface, have a larger width than the corresponding width of the hollow area of the closed hollow support. When the two hollow support halves are pressed together for the welding-together of the longitudinal edges, the larger width of the stiffening sections causes a contact pressure onto the mutual contact surfaces, permitting a better indirect welding-together at this point.

Other objects, advantages and novel features of the present invention will become apparent from the following detailed description of the invention when considered in conjunction with the accompanying drawings.

BRIEF DESCRIPTION OF THE DRAWINGS

FIG. 3 is a view of another hollow support similar to FIG. 1 having different mutual contact surfaces for the stiffening sections;

FIG. 4 is a view of the hollow support according to FIG. 3 in the assembled condition.

DETAILED DESCRIPTION OF THE DRAWINGS

Figure 1:
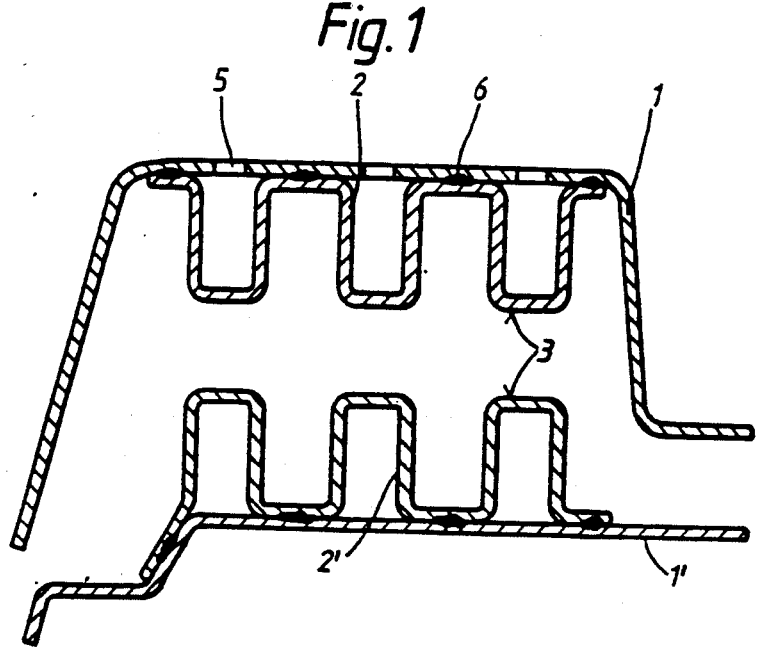
FIG. 1 is an individual representation of prepared hollow support halves for a closed hollowing support according to the invention.

FIG. 1 shows a cross-section of the prepared piece parts of the closed hollow support used as a box girder in a vehicle frame, consisting of support section 1, 1' and of stiffening sections 2, 2'. The stiffening sections, 2, 2' are welded at point 6 to respective contact surfaces on the interior side of the support sections 1, 1'. The stiffening sections 2, 2' have a largely meandering shape. They meander at right angles between the interior top surfaces of the support sections 1, 1' into mutual contact surfaces 3 located approximately in the center of the hollow support. The stiffening sections extend in the longitudinal direction (into the paper showing the cross-sectional view of the drawing in FIG. 1). In addition, the stiffening sections 2, 2' are mounted almost symmetrically and mirror-invertedly with respect to one another in the hollow space of the hollow support. Viewed from the direction of the support section 1, 1', the projection of the stiffening sections 2, 2' from the support sections 1, 1' amount to slightly more than half of the final distance between outer sides of the support sections, i.e., the width of the closed hollow support. Holes 5 are disposed on the side of one support section 1, which is opposite the projection of the stiffening section 2'. These holes 5 are required for the subsequent welding together of the stiffening sections 2, 2' at their contact surfaces 3 at welding points 4, using welding electrodes 8.

When the support sections 1, 1' are welded together at their longitudinal edges 7, the contact surfaces 3 of the stiffening sections 2, 2' are located in parallel with respect to one another and are under pressure due to the fact that their height was slightly more than the half distance between sections 1, 1'. The welding electrode 8 (for the indirect welding with the copper back-up heat sink bar 11 under the support section 1') is introduced through the respective hole 5 of the support section 1, and the contact surfaces 3 of the stiffening sections 2, 2' are welded together with one another several times over the longitudinal course of the hollow support at welding points 4. Subsequently, it is possible, to close the holes 5 in the support section 1, by means of plastic caps for example.

Figure 2:
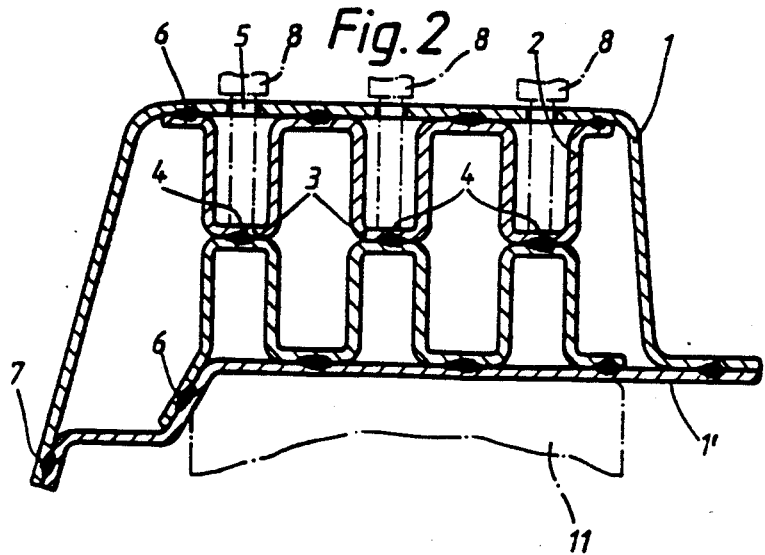
FIG. 2 is a view of the hollow support according to FIG. 1 in the assembled condition.

FIG. 3 shows another embodiment of the invention with a not yet assembled hollow support and which differs from the hollow support according to FIG. 1 and 2 by the design of the mutual contact surfaces of the stiffening section 32 with their connections. The stiffening section 32, in this embodiment, has a protuberance 23 for electric resistance welding at the mutual contact surfaces 3 of the stiffening sections 32, 33 located at the left. On the right it has bores 24(a-d) at the other two contact surfaces. Bores 24(b) and (d) have the same diameter for accepting a rivet 4'', while bores 24(a) and (c) have different diameters with diameter 24(c) being threaded to receive a screw 4' loosely placed through the larger diameter bore 24(a).

The protuberance 23 is used for an improved indirect welding since, when the closed hollow support is assembled, the contact pressure at this contact surface is increased.

The central projection is provided with a screwed connection 4'. In the top sheet there is a larger 24(a) through-hole and in the bottom sheet there is a bore 24(c) which has a tapping thread and which is dimensioned to the diameter of the root of the thread and into which a screw can be screwed.

The mounting tool which pertain to the different connections is introduced into the respective holes 5 disposed in the support section 1. Specifically, starting from the left: electrode 8 for weldings 4, the copper back-up heat sink bar 11 being mounted under the bottom support section 1'; a magnetic button die with a rotating device 9 for the screwed connections 4',; rivet pliers 10 for blind rivets 4''. Naturally, this represents only one selection of the types of connections that could be used For example, the stiffening sections could be glued or soldered.

Figure 5:
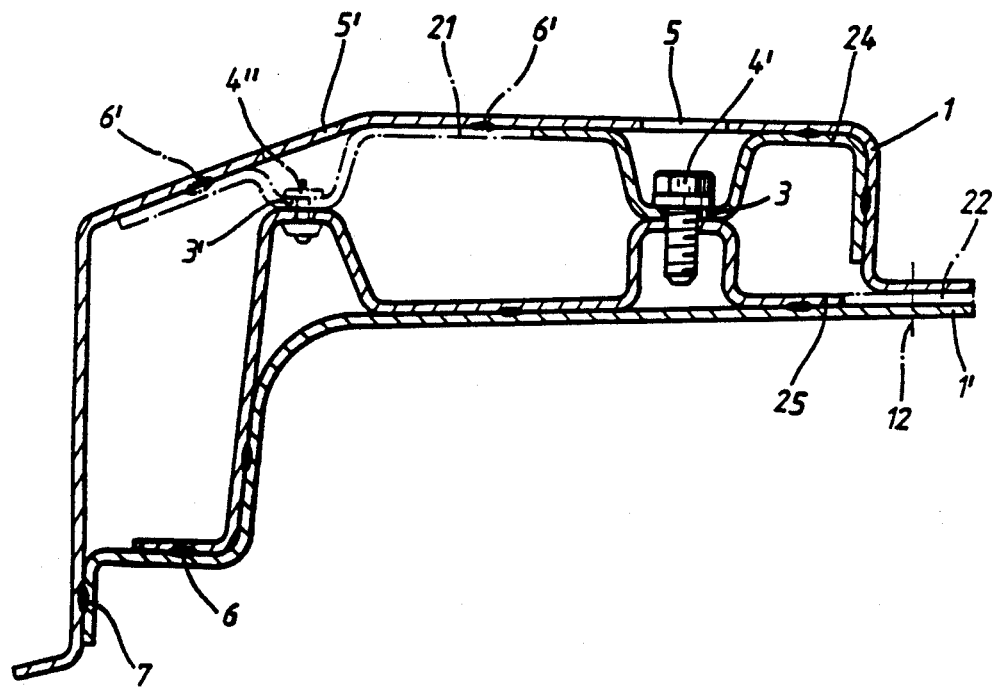
FIG. 5 is a view of another closed hollow support with different stiffening sections.

The support sections 1, 1' according to FIG. 5 correspond approximately to the support sections of FIG. 1. The only difference in this embodiment is the construction of the stiffening sections 25, 24. Lower stiffening section 25, connected with the bottom support section 1', is formed almost over the whole cross-sectional course of the bottom support section 1' and has two projections. Upper stiffening section 24, connected with the top support section 1 extends only in areas over the cross-sectional course of the top support section 1. Only in the area that cooperates with the right hand projection from the lower stiffening section, is it constructed symmetrically with respect to the opposite stiffening section 25. In the present case, the two stiffening sections 25, 24, at their mutual contact surface 3, are connected by means of a screwed connection 4'. The screwed connection 4' is advantageously obtained by a tapping and self-adhering screw.

Alternatively both, or either stiffening, sections 25, 24 may also be constructed to be wider as shown by a dash-dotted line in FIG. 5. Also they may have an additional mutual connection as shown by blind rivet 4''. However, it was found that the stability of this closed hollow support is not increased very much by means of the dash-dotted widening 21/22. However, this widening does increase the expenditure of time and material. If the stiffening section 25 connected with the bottom support section 1' is constructed such that its widening 22 projects into the area between the longitudinal support sections 1, 1', it will be connected with them at connection 12.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A closed hollow support includes two sheet metal support sections that are welded together in the area of their longitudinal edges to define a hollow space between themselves;

two stiffening sections for reinforcing the hollow support are arranged in the hollow space of the hollow support;

these stiffening sections extend along a longitudinal direction of the hollow support and are welded to the hollow support;

each of the two support sections is welded to a respective stiffening section;

the stiffening sections have a meandering shape in cross-section at least in areas thereof;

the stiffening sections are arranged approximately mirror-invertedly with one another in the hollow space and have opposed mutual contact surface means extending in longitudinal direction of the hollow support for connection of these stiffening sections; and wherein hole means are provided in at least one support section in the area of these contact surfaces for passage of connecting tools for connecting the two stiffening sections together after the respective stiffening sections have each have welded to the support sections and the mutual contact surface means are aligned for connection.

2. A closed hollow support according to claim 1, wherein the mutual contact surfaces are connected together by any one of welding, screwing, riveting, gluing and soldering.

3. A hollow support according to claim 1, wherein, prior to assembly, the two stiffening sections taken together, have a width extending transversely and in the direction of the contact surface and of a larger size than a corresponding width of the hollow space between support sections.

4. A hollow support according to claim 2, wherein, prior to assembly, the two stiffening sections taken together, have a width extending transversely and in the direction of the contact surface and of a larger size than a corresponding width of the hollow space between support sections.

5. A hollow support according to claim 1, wherein at least one stiffening section has a protuberance at the contact surface.

6. A hollow support according to claim 2, wherein at least one stiffening section has a protuberance at the contact surface.

7. A hollow support according to claim 3, wherein at least one stiffening section has a protuberance at the contact surface.

8. The hollow support according to claim 4, wherein at least one stiffening section has a protuberance at the contact surface.

* * * * *